K. EGGART.
AUTOMATIC EMBROIDERING MACHINE.
APPLICATION FILED JUNE 19, 1911.
1,081,591.
Patented Dec. 16, 1913.
2 SHEETS—SHEET 1.
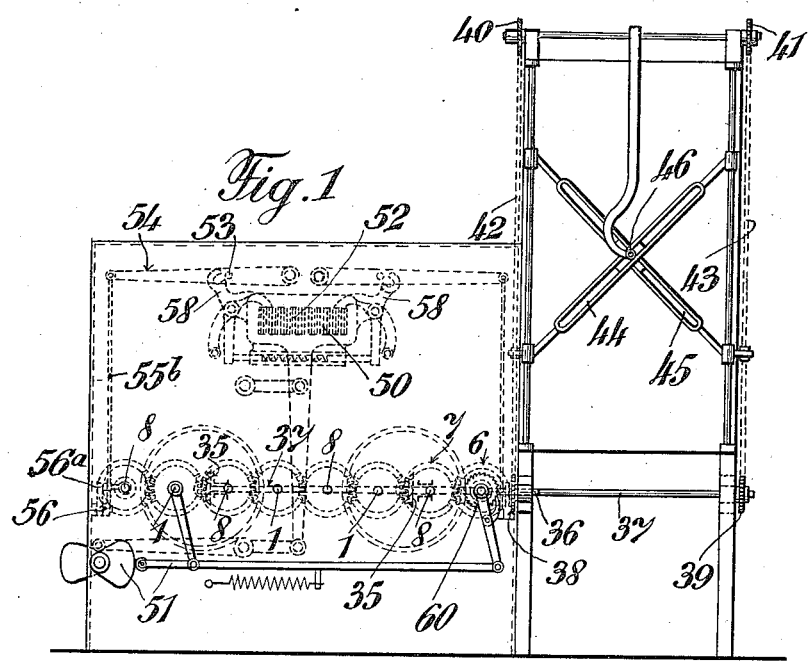
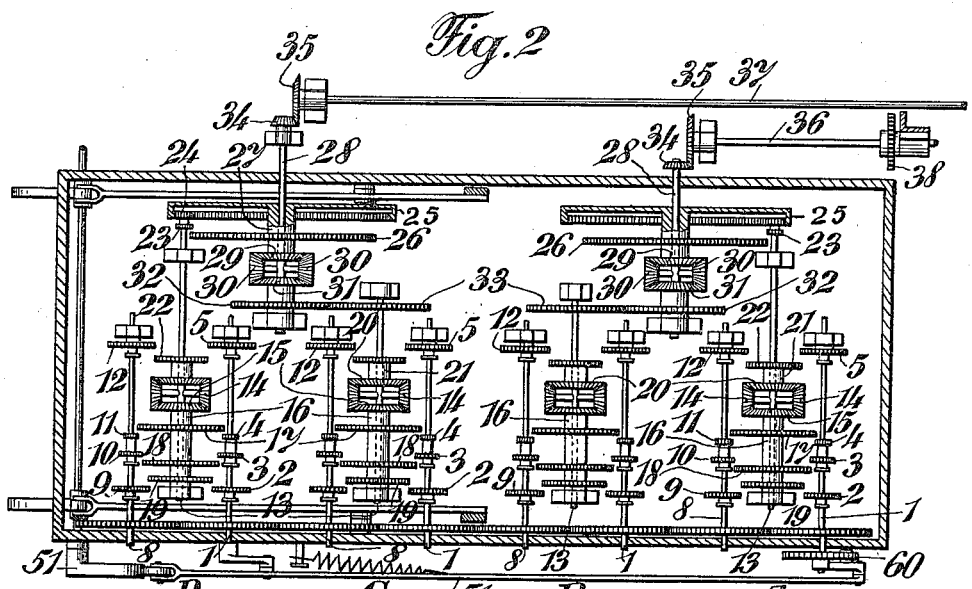
Witnesses:
R. V. Dommers
Elizabeth Leckert
Inventor:
Karl Eggart,
By Henry Orth Jr.
Atty.

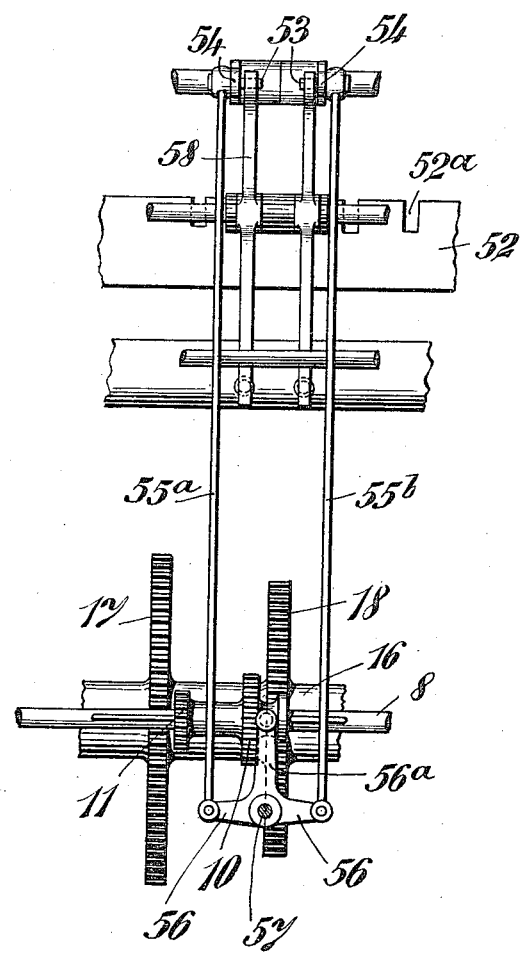

UNITED STATES PATENT OFFICE.

KARL EGGART, OF ARBON, SWITZERLAND, ASSIGNOR TO THE FIRM OF ADOLPH SAURER, OF ARBON, SWITZERLAND.

AUTOMATIC EMBROIDERING-MACHINE.

1,081,591.

Specification of Letters Patent. Patented Dec. 16, 1913.

Application filed June 19, 1911. Serial No. 633,958.

*To all whom it may concern:*

Be it known that I, KARL EGGART, a subject of the Emperor of Germany, residing at Arbon, Switzerland, have invented new and useful Improvements in Automatic Embroidering-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in automatic embroidering machines and consists in a device for moving a frame of automatic embroidering machines in any direction in a plane. For this purpose two components are necessary which are independent of each other and which may attain positive and negative values. Since said components are substantially obtained in the same way it is necessary only to consider one of the two components. This component must be able to attain all positive and negative values equally progressing from zero to a certain maximum value, that means all values of an arithmetical series, for instance $+1/10$, $+2/10$, $+3/10$, etc., and $-1/10$, $-2/10$, $-3/10$, etc.

With the device herein described a large arithmetical series is to be obtained by combining a single term, at least one original series and the combination of the single term with the original series. If, for example, an arithmetical series is to be formed, the common difference of which has to be equal to $1/10$, the same is obtained by means of a term, $7/10$ for instance, an original series, $1/10$, $2/10$, $3/10$ for instance and the combination of the term $1/10$ with the original series $1/10$, $2/10$, $3/10$. The following result is attained:

$$1/10 = 1/10$$
$$2/10 = 2/10$$
$$3/10 = 3/10$$
$$7/10 - 3/10 = 4/10$$
$$7/10 - 2/10 = 5/10$$
$$7/10 - 1/10 = 6/10$$
$$7/10 = 7/10$$
$$7/10 + 1/10 = 8/10$$
$$7/10 + 2/10 = 9/10$$
$$7/10 + 3/10 = 10/10$$

If, for another example the term is equal to $11/10$ and the short original series is $1/10$, $2/10$, $3/10$, $4/10$, $5/10$, an arithmetical series up to $16/10$ with a common difference of $1/10$ is obtained by combining the member, the original series and the combination of the term with the original series.

In most practical cases it is expedient to obtain a large arithmetical series. In these cases a multiple, $147/10$ for instance, of said term, $7/10$, is formed and combined with a multiple, $21/10$, $42/10$, $63/10$ for instance, of the original series $1/10$, $2/10$, $3/10$ of the above mentioned example. Thus by means of the multiple series a continued series $21/10$, $42/10$, $63/10$, etc. up to $210/10$ is formed with a larger common difference, viz. $21/10$. The intervals from $22/10$ to $41/10$ for instance, of this continued series are filled up by values obtained by combining the terms of the first obtained series, viz. $1/10$ to $10/10$ with terms of the continued series $21/10$, $42/10$, etc., etc. to $210/10$. By this a uniform total arithmetical series from $1/10$ up to $210/10$ with a common difference of $1/10$ is formed.

In the accompanying drawings Figure 1 is an elevation of an embroidering machine to which the said device is connected, Fig. 2 is a plan view of said device, Fig. 3 shows a detail in enlarged scale.

1 is a shaft to which an intermittent motion of rotation of a certain value and constant direction is imparted from a suitable cam mechanism 51 and ratchet 60 (Figs. 1 and 2). Toothed wheels 2, 3, 4 and 5 are slidably but not rotatably mounted on the shaft, all wheels being of different diameter. Another toothed wheel 6 is mounted rigidly on the shaft 1 and engages the toothed wheel 7 of the same diameter, which is secured to the shaft 8. Toothed wheels 9, 10, 11 and 12 are slidably but not rotatably mounted on the shaft 8. The wheels 2 and 9, 3 and 10, 4 and 11, and 5 and 12 relatively are of the same size. A shaft 13 is arranged between the shafts 1 and 8 and has secured to it or formed on it arms carrying bevel wheels 14 of a differential gear. The bevel wheel 15 engaging the bevel wheels 14 is fixed to a sleeve 16 in which the shaft 13 is free to rotate. Toothed wheels 17, 18 and 19 of different diameter are secured to the sleeve, which is held against axial movement. The wheels 17, 18 and 19 are made to engage the wheels 4, 3 and 2 with a ratio of gearing 7:1, 7:2 and 7:3 respectively. The other bevel wheel 20 of the differential gear is fixed to a toothed wheel 22 and to a sleeve 21, which is free to turn, but immovable in axial direction on the shaft 13. The latter is adapted to engage the wheel 5 of the same diameter. Also the wheels 9, 10, 11 and 12 can singly engage the wheels 19, 18, 17 and 22. These wheels on the shafts 1 and 8 may be controlled positively and automatically by the jacquard apparatus 50 (Fig. 1).

Fig. 3 illustrates for instance the control of the wheels 10, 11, 17, 18. According to the position of the blades 52 which are provided with notches 52$^a$ the arm of a certain lifter 58 will be able to enter the notches located side by side. The lifter hereby engages the corresponding pin 53 secured to a lever 54. Thereby the lever 54 and the corresponding rod 55$^a$ or 55$^b$ which is pivoted to this lever will be lifted. The rod 55$^a$ is pivoted to one end of a double-armed lever 56 and the rod 55$^b$ is pivoted to the other end of the lever. The lever is rotatably mounted on a fixed axle 57 and is caused by the rods 55$^a$ and 55$^b$ to turn in either direction. Accordingly the wheels 10 and 11, which are actuated by the arm 56$^a$ of the lever 56 are displaced to the left or to the right, so that either the wheel 10 can engage the wheel 18 or the wheel 11 can engage the wheel 17. The other wheels are controlled in the same way.

The above described part, A, of the mechanism is joined by like parts, B, C and D, the shafts 1 and 8 of which are connected to each other by toothed wheels of the same size, so, that all shafts 1 are rotating in the same direction, while all shafts 8 are rotating in opposite direction. Toothed wheels 23 and 24 are secured to the shafts 13 of the parts A and D. The wheels 24 can engage the toothed wheels 25 by internal gear, the ratio of gearing being 1:21, while the wheels 23 can engage the toothed wheels 26, the ratio of gearing being also 1:21. Since the wheels 25 and 26 are rigidly connected to each other a reversing gear is formed by this arrangement.

The wheels 25 and 26 are secured to sleeves 27, which are free to rotate, but immovable in axial direction on the shafts 28. A bevel gear 29 is fixed to each of the sleeves and engages two bevel gears 30, which are free to rotate around axles secured to the shafts 28. The three bevel gears in connection with a bevel gear 31 form a differential gear. The bevel gear 31 is also free to rotate around the shaft 28 and is rigidly connected to a toothed wheel 32, which engages a wheel 33 of the same diameter. The latter is secured on the shaft 13 of the parts B and C respectively. A bevel gear 34 is mounted on each of the shafts 28 and actuates a bevel gear 35. The bevel gear 35 of the parts A, B is mounted on a shaft 36 and the bevel gear of the parts C, D on a shaft 37. The shafts 36 and 37 actuate the arms 44 and 45 of the cross by means of chain wheels 38, 39, 40 and 41 and chains 42 and 43. The pin 46 of a pantograph is slidably mounted in the arms 44 and 45 so that the combined or resultant movement of the two arms 44 and 45 is transmitted to the pantograph pin 46.

A and B are to form one component, C and D the second component. The first arithmetical series from 1/10 to 10/10 is obtained by A and D, the continued series from 21/10, 42/10, etc. to 210/10 by B and C. The remaining intervals of the continued series are formed by the gear connecting the shafts 13 of A and B, and of C and D. The changing from positive to negative values is performed by the reversing gears 25, 26, 24, 23. To each shaft 1 a certain motion is imparted, which is transformed to a variable motion of the shafts 36 and 37, the motion being graduated according to a total arithmetical series from 1/10, 2/10, etc. up to 210/10.

I claim:

1. In a mechanism for imparting movement to embroidery frames of automatic embroidering machines, a driving shaft for transmitting variable movement to the frame, rotating mechanism to selectively positively and negatively rotate said shaft in accordance with any member of an arithmetical series, a second rotating mechanism to selectively positively and negatively rotate said shaft in accordance with any member of another arithmetical series either independently of or simultaneously with the aforesaid mechanism, whereby the algebraic sum of the rotary movements of the two mechanisms is imparted to said shaft.

2. In mechanism for imparting movement to embroidery frames of automatic embroidering machines, a driving shaft for transmitting variable movement for one component of the movement of the frame; mechanism including rotating means to selectively positively and negatively rotate said shaft in accordance with any member of an arithmetical series, and a second rotating mechanism to selectively positively and negatively rotate said shaft in accordance with any member of another arithmetical series whose common difference is a multiple of the common difference of the first mentioned series, said second mechanism imparting its motion of rotation to the driving shaft either independently of or simultaneously with the first mechanism.

3. In mechanism for imparting movement to embroidery frames of automatic embroidering machines, a driving shaft, means to selectively positively and negatively rotate said shaft, comprising a pair of parallel oppositely rotating shafts each having pinions thereon corresponding to a short arithmetical series and a single pinion representing a term which is the multiple of the common difference of said series, an actuating shaft having differential mechanism thereon and gear wheels with which the corresponding pinions on said parallel shafts are arranged to engage, said single pinion engaging a wheel on one side of the differential mechanism and the remaining pinions engaging wheels on the other side of said mechanism.

4. In mechanism for imparting movement to embroidery frames of automatic embroidering machines, a driving shaft, a differential mechanism for actuating the same, reversing gear wheels connected to said mechanism, a pair of actuating shafts, a differential mechanism on each of said actuating shafts, one of which shafts is arranged to operate said reversing gear wheels at a low speed and the other of which shafts is arranged to operate the first mentioned differential mechanism at a higher speed, gear wheels on said actuating shaft reversing mechanisms, a pair of shafts parallel to each actuating shaft, pinions on said parallel shafts arranged to selectively engage the gear wheels on said actuating shaft reversing mechanism, said pinions on each parallel shaft representing a short arithmetical series arranged to engage said gear wheels on one side of the differential mechanism and one pinion engaging a wheel on the opposite side of said differential mechanism, and means to impart opposite step-by-step rotation to the shafts of a pair of parallel shafts.

5. In mechanism for imparting movement to embroidery frames of automatic embroidering machines, a driving shaft, a differential mechanism for actuating the same, reversing gear wheels connected to said mechanism, a pair of actuating shafts, a differential mechanism on each of said actuating shafts, one of which shafts is arranged to operate said reversing gear wheels at a low speed and the other of which shafts is arranged to operate the first mentioned differential mechanism at a higher speed, gear wheels on said actuating shaft reversing mechanisms, a pair of shafts parallel to each actuating shaft, gear wheels on said parallel shafts gearing them together to rotate in unison, pinions on said parallel shafts arranged to selectively engage the gear wheels on said actuating shaft reversing mechanism, said pinions on each parallel shaft representing a short arithmetical series arranged to engage said gear wheels on one side of the differential mechanism of the actuating shaft and one pinion engaging a wheel on the opposite side of said differential mechanism, and a pawl and ratchet mechanism to operate one of said parallel shafts step-by-step, whereby all of said shafts are synchronously rotated, the shafts of a pair being rotated in opposite directions.

6. In mechanism for imparting the component movements for the embroidery frames of automatic embroidering machines, a driving shaft for each component movement, a mechanism for selectively positively and negatively rotating each of said shafts in accordance with any member of an arithmetical series, a second mechanism for each of said shafts to selectively positively and negatively rotate said driving shaft in accordance with any member of another arithmetical series either independently of or simultaneously with the aforesaid mechanism, each of said mechanisms including a pair of parallel shafts geared together, one pair of shafts being geared to another, and means to impart step-by-step movement to one of said parallel shafts, whereby all of said mechanisms are synchronously operated and the driving shafts have imparted to them synchronously rotation values comprising a member of each arithmetical series or the algebraic sum of a member of two arithmetical series having a different common difference.

In testimony that I claim the foregoing as my invention, I have signed my name in presence of two subscribing witnesses.

KARL EGGART.

Witnesses:
ERNST FISCHER,
AUGUST RUEGG.